(No Model.) 2 Sheets—Sheet 1.
J. T. BACH.
CORN HARVESTER.
No. 585,173. Patented June 29, 1897.
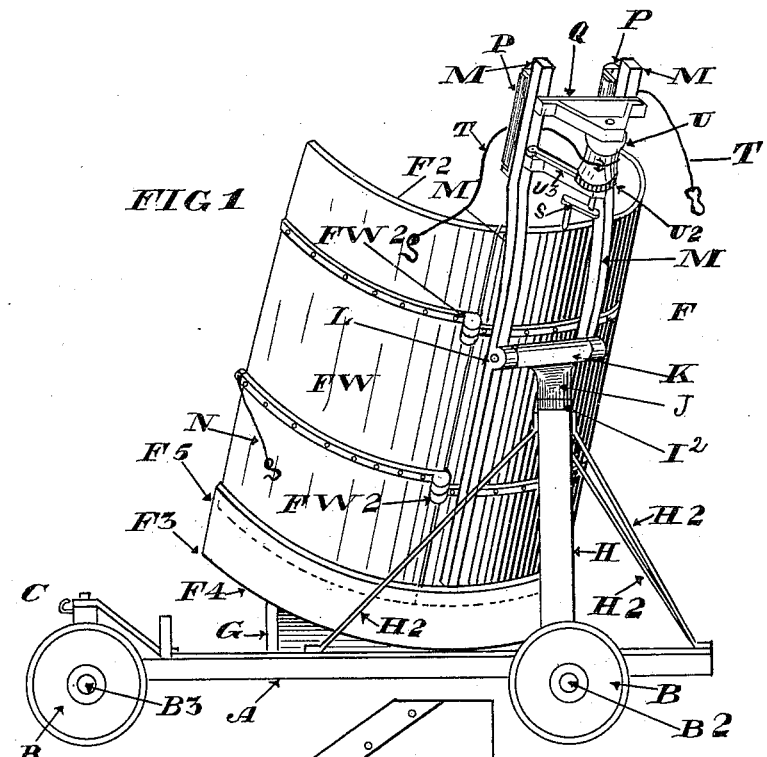
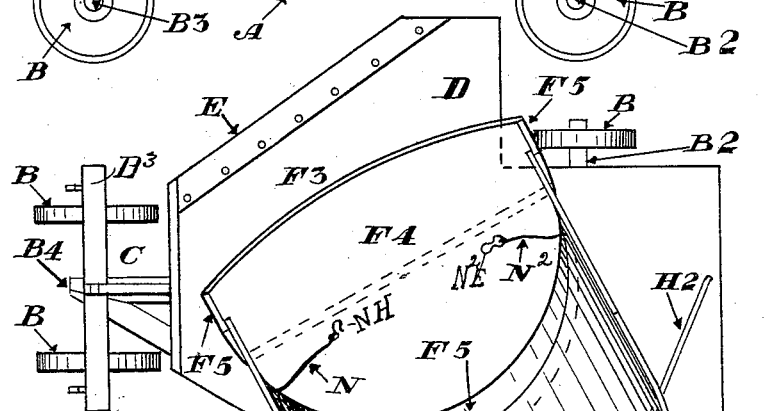
Attest
Burgan Sheafer
Thomas J. Cross
Inventor
John Thomas Bach
THE NORRIS PETERS CO., PHOTO-LITHO., WASHINGTON, D. C.

(No Model.) 2 Sheets—Sheet 2.
J. T. BACH.
CORN HARVESTER.
No. 585,173. Patented June 29, 1897.
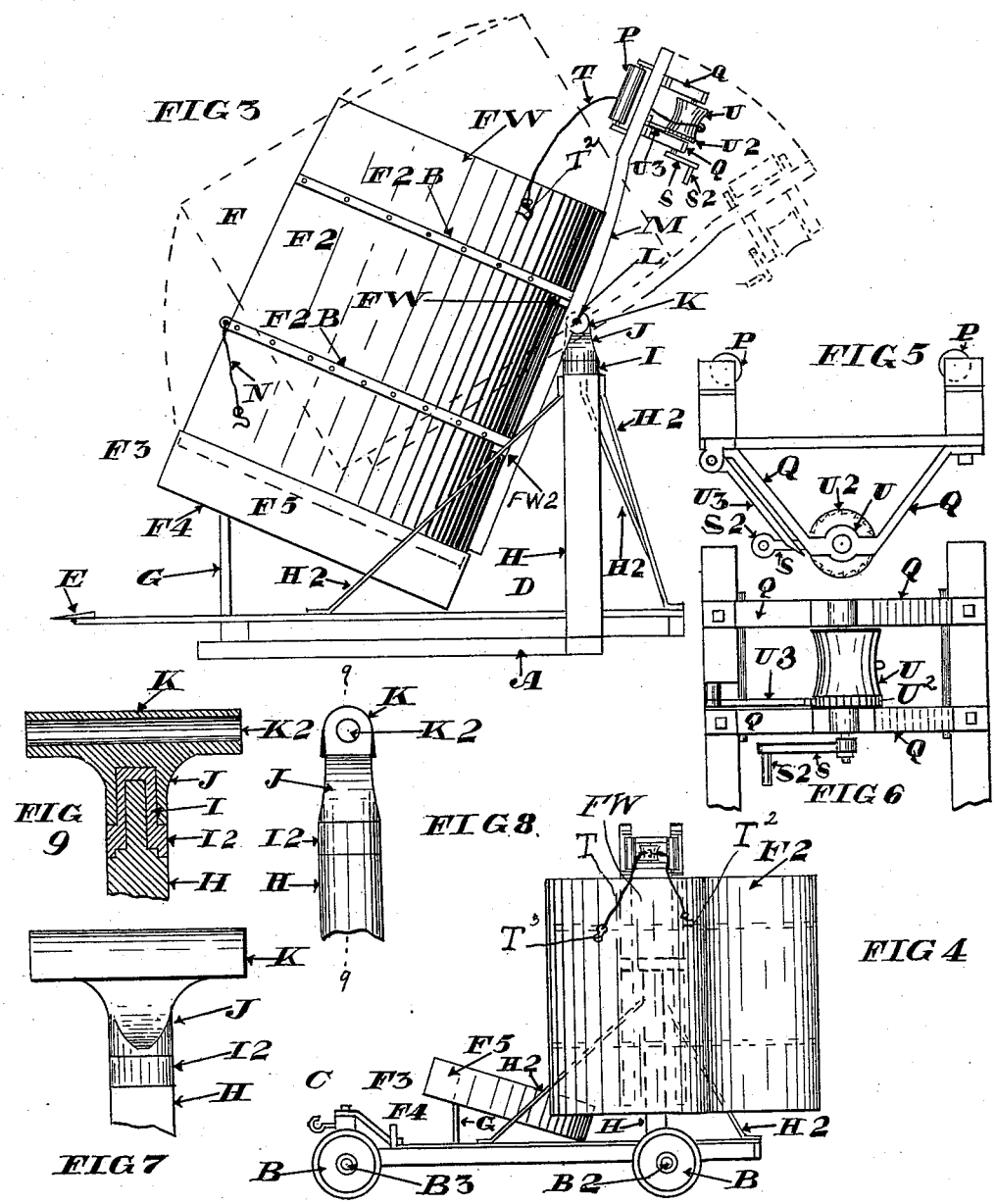

UNITED STATES PATENT OFFICE.

JOHN THOMAS BACH, OF PUTNAM COUNTY, OHIO.

CORN-HARVESTER.

SPECIFICATION forming part of Letters Patent No. 585,173, dated June 29, 1897.

Application filed March 25, 1896. Serial No. 584,813. (No model.)

*To all whom it may concern:*

Be it known that I, JOHN THOMAS BACH, a citizen of the United States, and a resident of the county of Putnam, in the State of Ohio, and whose post-office address is the town of Belmore, in the said county and State, have invented certain new and useful Improvements in Corn-Harvesters, of which the following is a specification.

In the accompanying drawings, making a part of this specification and in which similar letters of reference indicate corresponding parts, Figure 1, Sheet 1, is a side elevation of a machine illustrating my invention. Fig. 2 is a top view of the same machine with its parts in the same position as in Fig. 1. Fig. 3, Sheet 2, is a side elevation of the machine, omitting the running-gear and showing in dotted lines a position to which the shocker shown in full lines can be moved. Fig. 4 is a side elevation, on a diminished scale, of that side of the machine opposite to the one shown in Fig. 1, and showing the receiver in the position its parts assume when the shock is dropped from it. Figs. 5, 6, 7, 8, and 9 are details of parts of the machine, namely: Fig. 5 is a top view of devices for holding and operating the cord employed to hold the stalks to the receiver. Fig. 6 is a front elevation of the device shown in Fig. 5. Fig. 7 is a rear side elevation of the upper portion of the standard of the receiver and showing the pivotal construction there present. Fig. 8 is an elevation of either end of the parts shown in Fig. 2. Fig. 9 is a vertical central section taken at the plane of the dotted line 9 9 of Fig. 8.

The several features of my invention and the various advantages resulting from their use, conjointly or otherwise, will be apparent from the following description and claims.

I will now proceed to particularly describe my invention and its details.

A indicates a frame or platform supported on wheels B B B, the latter being of any suitable construction, shape, and size and mounted on axles. Of these the front axle $B^3$ is pivoted at $B^4$, so as to turn after the usual manner of front axles.

The forward end of the frame A is provided with suitable means for connecting to this machine the usual single or double tree or other connection whereby the machine can be drawn forward. One description of such means is shown and is indicated by the letter C.

Above the platform or frame A and duly supported thereby is the operating-platform D. At the forward part of the platform D is a suitable cutter E for severing the stalks near the ground. A preferred description of such cutting device is that shown, and consists of the shear-knife E, extending out to the right of the axle of the front wheels and backward, so as to meet the stalks of grain and cut them with a shearing cut.

The rear portion of the platform preferably extends out rearwardly to the left, as shown, and thus affords more room for the receiver F and its accompanying mechanism.

The receiver F consists of two parts—namely, first, a concave shell $F^2$ of a shape similar to that of a hollow cylinder, and, secondly, a bottom portion $F^3$, consisting of a bottom $F^4$ and a surrounding upwardly-extending flange $F^5$. The bottom is preferably inclined from rear upward toward the front edge and its flange partakes of such inclination. The object of having the shell and bottom take these inclinations is to enable the stalks when cut and placed in the receiver to lie back as the cylinder does, and by the force of gravity be duly held there in position awaiting the time when they are to be dropped. The bottom of the shell $F^2$ preferably extends down a little inside of and close to the flange $F^5$, and is thereby, if necessary, steadied and held in shape while being filled with stalks.

The parts of the receiver thus described are preferably of metal, and the shell is usually stiffened, &c., by bands $F^2$ B, substantially as shown. These bands enable the shell to be made of thin material, and be light of weight, and yet be strong and serviceable.

The bottom $F^3$ is duly secured to the platform, and is upheld at its higher end by a support, as G.

A suitable standard, as H, arising from the frame and steadied, when necessary, by suitable braces, as $H^2 H^2 H^2$, is at its upper end provided with a suitable pivotal device connected to the shell $F^2$ in such a manner as to admit of the shell being rotated around the standard to the rear of the machine, and also to admit of it (the shell) being oscillated, so that its lower end can be elevated and its upper end (of course) lowered, and be manipulated so that it can be placed, when desired, so that its axis of length can be horizontal. A preferred construction of this pivotal connection is shown, (see Figs. 1 and 3 and, in detail, Figs. 7, 8, and 9,) and consists of the metal vertical pivot I, having an annular shoulder I². On this pivot I is fitted a sleeve J, whose lower ends are in contact or proximity to the shoulder I². This sleeve J carries a cross tube or sleeve K, preferably integral with sleeve J. The opening K² through the tube K receives a pivot L. The ends of this pivot L respectively connect to pieces M M, duly secured to the shell F² at its rear portion. These pieces are for economy and convenience also used for another purpose shortly to be described. The standard H may be in one piece with the pivot I I², but for economy and lightness the standard H is of wood, and the pivot I I² is made hollow or cored out from below, and is then fitted down upon and over the upper end of the standard shaped to fit within this hollow or recess of the pivot I I². Thus constructed, the lower end of the shell can be uplifted, as shown in Fig. 3, by means of the pivot K L, thus enabling the bottom part of the shell to come out of engagement with the bottom F³ of the receiver, and also enabling the operator to shift the weight or the bulk of the weight of the shell and its contents of stalks upon the standard and then to rotate the shell and contents by means of the pivot J I I² until the bottom end of the shell is at the rear of the platform. The bottom end of the shell can be and is then lowered until the shell takes and occupies the position shown in Fig. 4.

One part F W of the shell and extending from top to bottom is hinged at suitable points, as F W² F W² and in a suitable manner. Thus after the shell F² has been moved to the position shown in Fig. 4 this part F W is swung out and the shell thus enlarged. Full opportunity is thereby given to readily disengage the stalks from the shell and deposit them standing upon the ground, and also enabling the shock to have a stand with a broad base, thereby preventing it from being easily overset.

Means for holding the stalks (the shock) in place in the receiver and fastening them to the shell, so as to prevent them from falling out and to hold them in place as the shell is moved and turned rearward until the time comes to drop and dump the shock, are preferably as follows: There is a lower binding device, to wit: A cord N is connected to one of the front edges of the shell about half-way down the length (height) of the latter, and a similar cord N² is connected to the other front edges of the shell. The free ends of these cords are usually respectively provided with a hook N H and an eye N² E, whereby they can be conveniently and quickly connected, although they may be tied or otherwise fastened together.

In practice the tops of the stalks collected in the shell will extend quite a distance above the upper edge of it. Thus a convenient opportunity of tying the stalk-tops together while on the machine is afforded. The stalk-tops should be tied very tightly together. Thus they can be well lifted along with the shell and carried around to the rear of the machine, and when the lower fastening N N² is loosened the bottom of the stalks will naturally separate somewhat, thereby increasing the base of the stalks (shock) when stood on the ground, and this tendency of the bottoms of the stalks to spread apart is increased by tying the tops (or heads) of the stalks closely together. A securing and fastening mechanism which carries into effect these objects is as follows: The pieces M M are extended up above the shell, as shown, and each carries an idle roller or pulley P, suitably journaled to its supporting-piece M and preferably located at the front side or edge of the piece M. A suitable frame Q extends from the pieces M M rearward and contains the windlass U, journaled in the frame Q and rotated by suitable means, as the crank S and handle S². Cords T are at one end secured to the windlass, and their free ends respectively carry a hook T² and eye T³ for interengagement.

In practice when the stalks are in the shell the cords are brought out and around the top of the collective bundle of stalks, thus embracing them, and the free ends of the cords are united by the hook T² and eye T³, or where these are absent these ends are tied. The windlass is now turned and the cords wound upon it, thereby forcibly drawing the heads or tops of stalks together and forming them into a compact bunch and securing them to the back of the shell F² and the pieces M M. The windlass is now prevented from unwinding by means of the ratchet-wheel U², concentrically fixed to the windlass or to its axle, and the pawl U³, pivotally fixed to frame Q and having its free ends placed in engagement with ratchet U² when the windlass is to be held stationary. The function of the rollers P is that of friction-rolls, preventing the cords T T, while being tightened and wound, from dragging against the pieces M M adjacent thereto.

Having already described parts of the operation, I now proceed to describe in general the continuous operation, namely: The machine, being in form as shown in solid lines in Figs. 1, 2, and 3, is moved forward, the cutter cutting off the stalks. The man (who is both driver and operator) stands on the platform D and catches the stalks and lifts them into the receiver F, standing their lower ends on the bottom F⁴, and leans the stalks against the inner side of the shell F. As the fresh stalks are cut he continues this operation of crowding them into the receiver and resting them side by side against the stalks already therein until the receiver is quite full. He then stops the movement of the machine over the field. He then draws the cords closely around the outer front portion of the shock of stalks and fastens these cords together, so that they will not slip. He then takes the cords and draws them around the top portion or head of the shock and fastens the ends of these cords together and then turns the windlass and tightens the cords sufficiently on the head of the stalks to closely compact the latter and secure the shock to the shell and to the pieces M M above, and he sets the windlass by pressing the pawl against a tooth of the ratchet-wheel. The shock is now in readiness to be moved. He then tilts the shell, &c., and shock therein to the position indicated by the dotted lines in Fig. 3, and then rotates the shell and its accompaniments with shock until the bottom end of the shell points rearward, as in a plane behind the standard H. The bottom end of the shell is now lowered until the shell (and of course the stalk therein) is vertical, and the shell and the stalks within it and held to it are now behind the machine. The cords are now untied and the bottom of the shock allowed to spread. A suitable tie is now made around the upper portion of the shock separate from and not connected to the machine. The pawl $U^3$ is now disengaged from the ratchet-wheel $U^2$, and the cords are disconnected from each other and removed from the end of the shock. The latter slips down for a short distance and then rests upon the earth. The shock has thus been cut, received, moved, bound, and deposited properly on the field. The operator now, if he has not already done so, pushes open the wing F W. Thus flattened, the shell has room to be moved and raised from behind the shock. He then tilts the shell on the pivot K L into a nearly horizontal position, rotates it on pivot I J, and reverses it end for end, and then tilts the bottom end of the shell and its mechanism into their first working position. (Shown in Figs. 1, 2, and 3.) The wing F W may be closed into its first working position at any time after the shell has come from behind the shock and before the shell is located in the bottom $F^3$. He then again starts the machine in motion over the field and the foregoing operation is repeated.

One man can by means of my machine cut and set up one hundred and twenty shocks per day. He cuts one row at a time. All traveling to a point distant from the machine is obviated. No gallus-hill is required to aid in setting up and forming a part of the shock. No corn is left uncut in order to set up the shock.

My machine enables the shock to be set up straighter than can be done when a gallus-hill is used and obviates all dragging of the stalks over the ground to form the shock. This latter operation causes the stalks to slip in respect to each other, and their bottom ends being no longer in a common plane they will not readily nor securely stand together when set up in the shock.

The horizontal pivot K L, if desired, may be dispensed with, but this pivot is a great convenience.

The position of the horizontal pivotal connection is preferably such as that when the stalks are secured therein and the shell and its contents are ready to be tilted the weight of the shell, securing devices, and stalks will be nearly equal before and behind said pivot, when the shell is horizontal or nearly so. Such distribution of weight enables the shell, &c., and its contents to be readily manipulated.

The wing F W, as a wing and hinged, may also be omitted, but its presence is a great convenience in slipping or moving the shell from behind the freshly-dropped shock.

What I claim as new and of my invention, and desire to secure by Letters Patent, is—

1. The combination of the shocking-shell bottom $F^3$ provided with the outlying flange $F^5$, and the separable shell made in hinged sections supported by the flange when the shell is in conjunction therewith, and when it is receiving the stalks, and the lower binding device N, and an upper stalk-head-securing device, substantially as and for the purposes specified.

2. In a shocking-machine, the combination of a running-gear, an operating-platform extending to the right of said gear and a draw cutting-knife on said extended portion of the platform and extending outward and backward, the platform extending to the left of the gear, at its (the platform's) rear part, and an inclined shock-receiver having an inclined bottom $F^4$, having flange $F^5$, and a shell $F^2$, and devices for securing the shock in and to the shell, and connected with the shell, and a supporting-standard, and pivotal connections between the shell and the platform for conferring upon the shell a capacity to be tilted, and to be swung, substantially as and for the purposes specified.

3. The combination of the shocking-shell bottom $F^3$ having the peripheral flange $F^5$, and the shell made in hinged sections, and pivotally supported, for imparting to it the tilting and swinging motions, and devices for securing the stalks in position in the shell, substantially as and for the purposes specified.

JOHN THOMAS BACH.

Attest:
THOMAS J. CROSS,
BURGAN SPEAKER.